United States Patent [19]

Marola et al.

[11] 4,106,826
[45] Aug. 15, 1978

[54] BEARING WITH LUBRICATING SYSTEM

[75] Inventors: Americo Edward Marola, Torrington; Leo Stella, Bristol, both of Conn.

[73] Assignee: The Torrington Company, Torrington, Conn.

[21] Appl. No.: 826,453

[22] Filed: Aug. 22, 1977

[51] Int. Cl.² ............................................. F16C 33/66
[52] U.S. Cl. ..................................... 308/187; 74/569; 308/208
[58] Field of Search ................. 308/187, 187.1, 187.2, 308/212–214, 208–209, 202, 18, 78, 101, 103, 104, 113, 114, 97, 207, 36.1; 137/512.5, 512.1; 74/569

[56] References Cited

U.S. PATENT DOCUMENTS

| 2,318,903 | 5/1943 | Thomas | 308/208 X |
| 2,611,387 | 9/1952 | Legerski | 137/512.5 X |
| 2,712,478 | 7/1955 | Carroll | 308/187 X |
| 3,413,045 | 11/1968 | Wohlfeld | 308/187 X |

Primary Examiner—Trygve M. Blix
Assistant Examiner—Douglas C. Butler
Attorney, Agent, or Firm—Frank S. Troidl

[57] ABSTRACT

A longitudinal lubrication bore extends at least partially through the inner member of a bearing. A radial bore may extend from the longitudinal bore to the raceway on the bearing inner member. A one-way check valve is permanently assembled in the longitudinal bore. The valve permits the flow of lubricant into the longitudinal bore and into the bearing space between the inner race and outer race of the bearing.

6 Claims, 5 Drawing Figures

BEARING WITH LUBRICATING SYSTEM

This invention relates to bearings. More particularly this invention is a track roller or cam follower type bearing including a lubrication bore and at least one one-way check valve as a permanent part of the bearing assembly to permit the entry of lubricant into the space between the inner and outer races of the bearing and to prevent loss of lubricant back through the lubrication channel and out of the bearing.

In a typical track roller or cam follower type bearing a longitudinal lubrication hole is often drilled through the stud or inner race member, generally with a cross-hole added to provide access to the raceway surface for lubricating the bearing elements. The lubrication holes are provided for the user who may wish to re-lubricate the bearing during its life cycle. Depending on the user's needs for lubricating or not lubricating the bearing and for excluding contaminants, it may be necessary to plug one or both holes if no re-lubrication is required or to insert a lubrication fitting in one end of the longitudinal lubrication hole and to plug the end opposite to the end being lubricated. The plugs contain the lubricant and exclude contaminants, and the lubrication fitting normally has its own internal check valve apparatus which does the same job in addition to allowing the lubricant to enter.

Several examples of conventionally used bearings are: the roller bearing cam follower shown in U.S. Pat. No. 3,596,533 patented Aug. 3, 1971 in the name of George C. Nightingale; the plain bearing cam follower shown in U.S. Pat. No. 4,005,916 — Canfield; the slide bushing cam follower shown in German Utility Patent No. 7,046,864; the ball bearing assembly shown in U.S. Pat. No. 3,010,771 — Cogger; the track roller assembly shown in U.S. Pat. No. 3,504,952 — Farmer. Examples of lubrication fittings are shown in U.S. Pat. No. 1,974,150 — Creveling and U.S. Pat. No. 2,151,171 — Thomas, et al.

Since the lubrication requirements and method of lubrication vary with each user's application, the bearing manufacturer conventionally supplies loose plugs with each bearing assembly having the lubrication channels or holes. The user must then assemble these plugs and/or lubrication fittings which he himself must supply, to either or both ends to suit his conditions. This is an inconvenience and an added expense to the user.

This invention avoids this inconvenience and added expense. It provides a bearing with an initially closed lubrication system which can be lubricated from either hole end as desired by the user, or from a single end if he desires to specify it this way, without his having to stock and handle extra lubrication fittings and apply them to the bearings. The bearing may or may not have seals. It may also be adapted to use a liquid lubricant by proper choice of check valve materials and lubrication fittings.

The invention to be described herein is particularly useful in a cam follower type bearing and will be described in detail with regard to its use in a cam follower. However, the system can be used in other bearing types which employ lubrication systems.

Briefly described, the invention includes an inner race member with a raceway and an outer race member with a raceway. A longitudinal bore extends at least partially through the inner member. At least one radial lubrication bore is also generally provided in the inner member and extends from the longitudinal bore to the inner raceway. A one-way check valve is mounted within the longitudinal bore as a permanent part of the bearing and not disassembleable as a unit. The valve is adapted to permit the flow of lubricant into the longitudinal bore, through the radial bore, and into the space between the races. In some bearings, the lubricant flows through the longitudinal bore and into a closed space at the far end of the bearing and then on into the bearing space between the races. Some bearings also have a second radial bore outside of the bearing space to act as the inlet for the lubricant. Our one-way valve might be installed in this bore. The check valve may be located deep enough in the longitudinal bore that a lubrication fitting may be fit in the bore behind it.

The invention, as well as its many advantages, may be further understood by reference to the following detailed description and drawings in which.

In the various Figures, like parts are referred to by like numbers.

Figure 1:
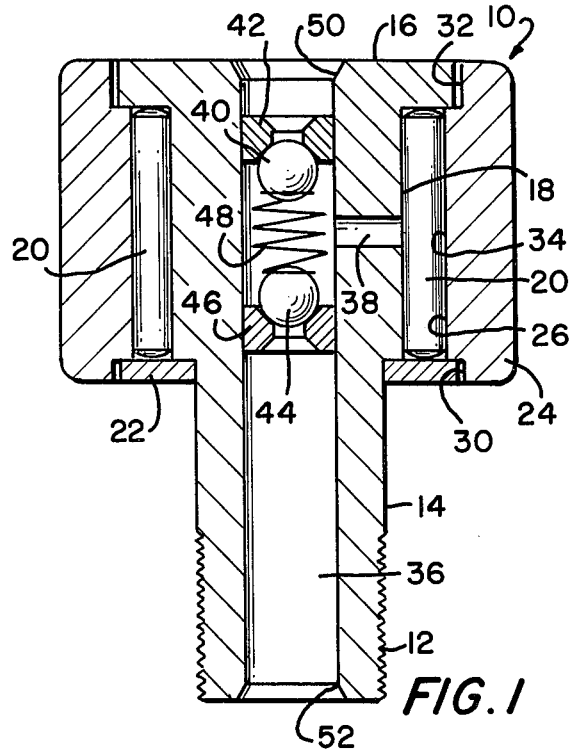
FIG. 1 is a sectional view of a first preferred embodiment of our invention.

Referring to the drawings, FIG. 1 shows a roller bearing cam follower 10 with a threaded portion 12 at one end of the stud or inner race 14 so that the entire bearing may be secured to a suitable arm for transmitting motion. Stud 14 has a integral flange portion 16 at one end thereof and adjacent this flange there is a bearing surface 18 having a reduced diameter from the outer diameter of flange portion 16 and acting as the inner raceway of the bearing. A plurality of rollers 20 are disposed about the stud 14 on the bearing surface 18 and the rollers are axially retained in position by the end flange 16 and an annular end plate or retainer plate 22. The end plate has a press fit with the stud surface and has substantially the same outer diameter as the flange 16.

An outer member 24 has a bore 26 and counterbores 30 and 32 in its axial ends. The raceway 34 of the outer member 24 is positioned lengthwise between the counterbores 30 and 32 and bears upon the rollers 20.

Lubrication for the rollers 20 is provided through the longitudinal lubricant duct 36 which extends through the center of the stud 14 and which is in communication with the outer bearing surface 18 of the inner race by means of a radial bore 38. A space defined by the raceway 34 on the outer member 24 and the raceway 18 on the inner member or stud 14 forms the annular lubricant holding space in which the rollers are located. When so desired, the rollers are circumferentially spaced by a cage or separator.

The longitudinal bore extends at least partially through the inner member or stud 14. In the embodiment shown in FIG. 1, the longitudinal bore 36 extends longitudinally entirely through the stud 14.

There is as a permanent part of the bearing and not separable from it as a unit at least one spring biased one-way check valve in the longitudinal bore; and in the embodiment shown in FIG. 1 there are two one-way spring biased valves. These are not unitary check valves which can be handled and installed as complete self-contained units such as are shown in U.S. Pat. No. 2,151,171 — Thomas et al. Units such as Thomas' require more parts and more handling, and thus are more expensive in the completed bearing.

One of our check valves comprises a ball check 40, and a ball valve seat 42 which is press-fit or bonded into bore 36. The other valve includes the ball check 44 and the valve ball seat 46 also press-fit or bonded into bore 36. Both balls 40 and 44 are spring biased by a common biasing spring 48 toward their respective valve seats. A conical seat 50 is located at one end of the longitudinal bore 36 and a conical seat 52 is located at the other end of the longitudinal bore 36. The proper nozzle of a grease gun would be pressed against the conical seat 50 or the conical seat 52, as the case may be, when it is desired to lubricate the space between the two races. Alternatively, another lubrication fitting may be applied to the end of the longitudinal bore to adapt to a different grease gun nozzle. When desired, the ball seats may be located near the ends of bore 36 to contain a larger supply of lubricant and to keep the entire lubrication channel free of contaminants. In this case, the lubrication nozzle may be pressed against the outer seat of the valve seat itself. Preferably, the piece forming the valve ball seat will have identical seats on both ends to avoid the necessity of selecting a particular end to install inwardly and to provide the seat for the grease gun nozzle. Our valve seat is preferably made by either the sintered powdered metal process or a typical screw-nut forming process for much higher production rates and lower costs than the typical screw machine process of producing standard "zerk" lubrication fittings.

Because our permanent non-unitary check valve utilizes the wall of the lubrication bore to eliminate the need for an outer valve casing as used in unitary type self-contained check valves, we can have an operable check valve in a diametrically smaller space than can other manufacturers. This is of benefit in small bearings and cam followers where a larger lubrication hole might deleteriously weaken the bearing or where there just simply is not enough room for the larger hole necessary to accept the standard commerical lubrication fitting.

Figure 2:
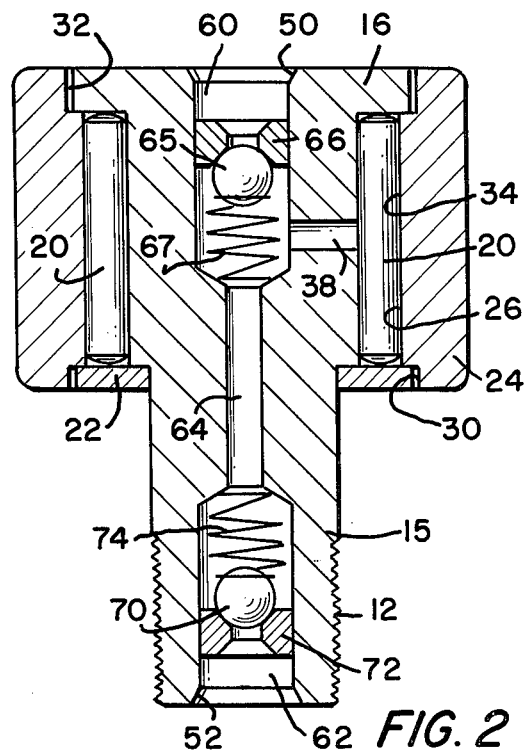
FIG. 2 is a sectional view of still another preferred embodiment of our invention.

In the embodiment shown in FIG. 2, the longitudinally extending bore through the inner member or stud 15 includes a relatively large diameter counterbore 60 extending from one end of the inner member 15 and a relatively large counterbore 62 extending from the other end with a relatively smaller diameter drilled hole 64 connecting the two end counterbores. The ball check valves are biased by separate springs and comprise a ball 65 biased against ball seat 66 by a coil spring 67 and a ball 70 biased against ball seat 72 by the coil spring 74.

Figure 3:
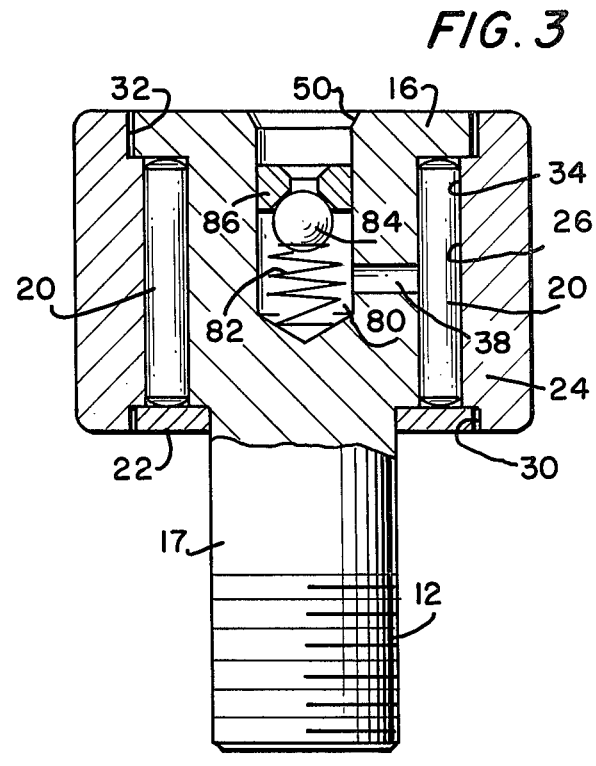
FIG. 3 is a sectional view of still another preferred embodiment of our invention.

In the embodiment shown in FIG. 3, the longitudinal bore 80 extends only partially through the inner member or stud 17. The coil spring 82 biases the ball 84 against the ball seat 86.

Figure 4:
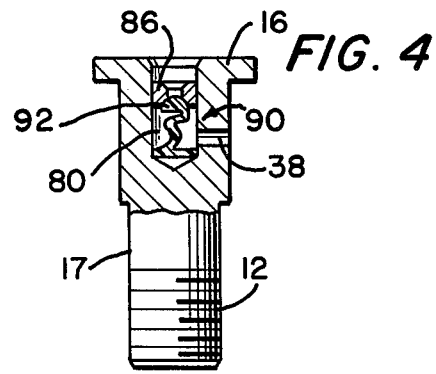
FIG. 4 is a sectional view of still another preferred embodiment of our invention.

In the embodiment of FIG. 4, a plastic one piece spring member 90 has a hemispherical valve check section 92 closing against the valve seat 86.

The shape and construction of the plastic one piece spring member is such that the generally "s"-shaped portion is flexible and acts like a spring to bias the valve check section 92 against the valve seat 86.

Figure 5:
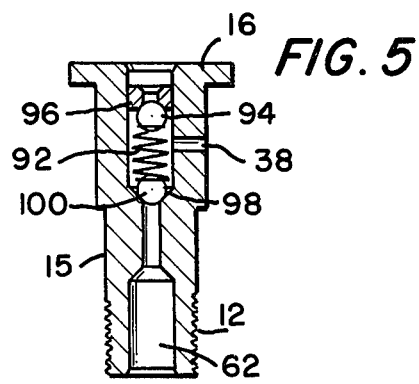
FIG. 5 is a sectional view of still another preferred embodiment of our invention.

In the embodiment of FIG. 5, the coil spring 92 biases ball 94 against seat 96. A second ball check uses the bottom tapered wall 98 of the relatively large diameter counterbore as the ball seat for ball 100. The single spring 92 biases both balls toward their seats.

We claim:

1. A bearing comprising: an inner race member with a raceway and an outer race member with a raceway spaced from said inner race member raceway to provide an annular bearing space, the inner member having a longitudinal lubrication bore extending at least partially through the inner member; roller bearing members in said annular bearing space; a communicating passage from the longitudinal bore to the inner member raceway; and at least one one-way check valve mounted within said longitudinal lubrication bore as a permanent part of the inner race member, said valve including a valve seat in direct contact with the wall of the longitudinal lubrication bore and adapted to permit the flow of lubricant through the longitudinal lubrication bore, through the communicating passage, and into said annular bearing space, and to prevent the flow of lubricant back past the check valve and to exclude contaminants.

2. A bearing in accordance with claim 1 wherein: the longitudinal lubrication bore in the inner member extends entirely through said inner member; the communicating passage is a radial bore and there are two one-way check valves, one adapted to permit the flow of lubricant from one end of the longitudinal lubrication bore through one of said one-way valves, through the radial bore and into said annular bearing space, and the other adapted to permit the flow of lubricant from the other end of the longitudinal bore through the second of said one-way valves, said radial bore, and into said annular bearing space.

3. A bearing in accordance with claim 2 wherein: both one-way valves are biased by a single spring.

4. A bearing in accordance with claim 2 wherein: a separate spring biases each of the two one-way valves.

5. A bearing in accordance with claim 1 wherein: the longitudinal bore extends only partially through said inner member.

6. A bearing comprising: an inner substantially cylindrical member having at least a longitudinal portion of its outer periphery serving as an inner raceway; a second substantially cylindrical rotatable member having at least a longitudinal portion thereof serving as an outer raceway, said raceways being spaced apart to provide an annular bearing space; a plurality of rolling bearing members in said annular bearing space; the inner member having a longitudinal bore extending at least partially through it, and at least one radial bore extending from said longitudinal bore into said annular bearing space; and at least one spring biased, one-way check valve in the longitudinal bore in the inner member, said valve including a valve seat in direct contact with the wall of the longitudinal bore, said valve adapted to permit the flow of lubricant through the longitudinal bore through said one-way valve, through said radial bore, and into said annular bearing space.

* * * * *